United States Patent [19]

Chester et al.

[11] Patent Number: 4,767,733

[45] Date of Patent: Aug. 30, 1988

[54] AMORPHOUS REFRACTORY COMPOSITION

[75] Inventors: Arthur W. Chester, Cherry Hill; Garry W. Kirker, Washington Township, Gloucester County, both of N.J.

[73] Assignee: Mobil Oil Corporation, New York, N.Y.

[21] Appl. No.: 50,445

[22] Filed: May 18, 1987

[51] Int. Cl.[4] .................. B01J 21/04; B01J 23/10; B01J 27/18

[52] U.S. Cl. .................. 502/65; 502/208; 502/209; 502/210; 502/211; 502/213; 502/439

[58] Field of Search .............. 502/65, 208, 439, 209, 502/210, 211, 213

[56] References Cited

U.S. PATENT DOCUMENTS

| | | | |
|---|---|---|---|
| 2,876,266 | 3/1959 | Wegner | 260/641 |
| 3,755,146 | 8/1973 | Harris et al. | 208/112 |
| 4,179,358 | 12/1979 | Swift et al. | 208/114 |
| 4,210,560 | 7/1980 | Kehl | 252/437 |
| 4,228,036 | 10/1980 | Swift et al. | 502/65 |
| 4,363,748 | 12/1982 | Crum et al. | 502/208 |
| 4,376,067 | 3/1983 | Vogel et al. | 252/437 |
| 4,382,877 | 5/1983 | Kehl | 252/437 |
| 4,382,878 | 5/1983 | Kehl | 252/437 |

FOREIGN PATENT DOCUMENTS 3136584 8/1984 Australia.

*Primary Examiner*—W. J. Shine
*Attorney, Agent, or Firm*—Alexander J. McKillop; Michael G. Gilman; Dennis P. Santini

[57] ABSTRACT

This invention relates to a new and useful amorphous, solid, combination refractory composition and to its synthesis. The new composition is an x-ray amorphous rare earth aluminum phosphorus oxide having high surface area and unique pore size distribution. The composition is useful as a catalyst support and provides improvement over prior art supports such as alumina or aluminum phosphate for certain catalytic applications.

21 Claims, No Drawings

AMORPHOUS REFRACTORY COMPOSITION

CROSS-REFERENCE

This application is related by subject matter to copending application Ser. No. 938,476, filed Dec. 5, 1986; and to copending application Ser. No. 50,446, filed on even date herewith.

BACKGROUND OF THE INVENTION

1. Field of the Invention

This invention relates to a new and useful amorphous, solid, combination refractory composition and to its synthesis. The new composition is an X-ray amorphous rare earth aluminum phosphorus oxide having high surface area, a unique pore size distribution and which demonstrates thermal and hydrothermal stability. The composition is useful as a catalyst support and provides improvement over prior art supports such as alumina or aluminum phosphate for certain catalytic applications.

2. Discussion of Prior Art

Refractory inorganic materials have been used as catalyst supports for many different catalytic processes. It is common in the catalyst art to observe use of alumina for this purpose, for instance. Other examples of refractory inorganic materials include silica, silica-alumina, clays, crystalline zeolites, oxides of zirconium, titanium, cerium, thorium, lanthanum, calcium and magnesium, and phosphates of zinc, zirconium, thorium, cerium, calcium, magnesium and aluminum. A listing of such materials appears in Australian Pat. No. 31365/84.

Crystalline zeolites, both natural and synthetic, have been demonstrated to be effective catalyst supports. A large variety of synthetic zeolites are known, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

Aluminum phosphates are taught in U.S. Pat. Nos. 4,310,440; 4,385,994; 4,365,095; 4,361,705; 4,222,896; 4,210,560; 4,179,358; 4,158,621; 4,071,471; 4,014,945; 3,904,550 and 3,697,550, for example. Microporous aluminum phosphates have a composition typified as:

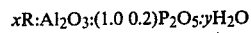

$$xR:Al_2O_3:(1.0 \pm 0.2)P_2O_5:yH_2O$$

wherein R is an organic amine or quaternary ammonium salt entrapped within the aluminum phosphate and playing a role as crystallization template, x and y representing the amounts of R and H₂O needed to fill the microporous voids.

U.S. Pat. No. 4,440,871 teaches material called silicoaluminophosphate without non-aluminum metals. Individual silicophosphoaluminate structures are shown in U.S. Pat. Nos. 4,623,527; 4,632,811 and 4,639,357. An antimonophosphoaluminate structure is taught in U.S. Pat. No. 4,619,818.

The phosphorus-substituted zeolites of Canadian Pat. Nos. 911,416; 911,417 and 911,418 are referred to as "aluminosilicophosphate" zeolites. These latter materials containing silicon, aluminum and phosphorus are characterized by the general formula:

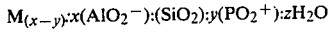

$$M_{(x-y)}:x(AlO_2^-):(SiO_2):y(PO_2^+):zH_2O$$

wherein M is a monovalent cation, x is approximately 0.125–1.5, y is 0.05–1.0 and z is the number of hydration water molecules. Structural replacement of silicon with phosphorus has been realized in materials called silica clathrates (West German Pat. No. 3,128,988). U.S. Pat. No. 4,363,748 describes a combination of silica and aluminum-calcium-cerium phosphate as a low acid activity catalyst for oxidative dehydrogenation. Great Britain Pat. No. 2,068,253 discloses a combination of silica and aluminum-calcium-tungsten phosphate as a low acid activity catalyst for oxidative dehydrogenation. U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid.

U.S. Pat. No. 4,382,877 describes a catalyst composition of a particular metal on a support containing (1) a compound of magnesium, calcium, strontium or barium, (2) alumina and (3) aluminum phosphate, the support having an average pore radius of from 10 to 300 Angstroms, a surface area of from 100 to 350 m²/g and a pore volume of from 0.3 to 1.5 cc/g. Various combinations of metal compounds, such as calcium, strontium, barium and magnesium oxide, with alumina and aluminum phosphate are described as catalyst supports in U.S. Pat. No. 4,382,878.

U.S. Pat. No. 4,376,067 describes a catalyst support containing various combinations of metal compounds, including zinc, cadmium, magnesium, calcium, strontium and barium compounds, alumina and aluminum phosphate. Magnesia-alumina-aluminum phosphate support material and its synthesis is described in U.S. Pat. No. 4,210,560. Use of a magnesia-alumina-aluminum phosphate supported catalyst for cracking is described in U.S. Pat. No. 4,179,358. U.S. Pat. No. 3,755,146 describes a high surface area catalyst support material comprising alumina, silica, titania, zirconia, boria and combinations thereof.

U.S. Pat. No. 2,876,266 describes an active silicophosphoric acid or salt phase of an amorphous material prepared by absorption of phosphoric acid by pre-molded silicates, e.g. aluminosilicates.

SUMMARY OF THE INVENTION

A new and useful amorphous, solid, combination refractory composition of rare earth aluminum phosphorus oxide having high surface area, and its synthesis are provided. Examples of the composition, useful as an improved catalyst support for certain catalytic applications, include rare earth oxide-aluminum oxide-aluminum phosphate, such as lanthana-alumina-aluminum phosphate, or mied rare earth oxide-aluminum oxide-aluminum phosphate. The rare earth metals include those with atomic number of 57 through 71, e.g. La, Ce, Pr, Nd, Sm, Eu, Gd, Tb, Dy, Ho, Er, Tm, Yb, Lu and mixtures thereof, such as lanthanum and cerium.

This new composition is synthesized by neutralizing a solution of rare earth metal or metals and aluminum in phosphoric acid with a basic solution. The presence of organic base, e.g. tetraalkylammonium or alkylamine, compounds in the synthesis reaction mixture results in a controlled modification of the pore size distribution of the final product composition.

EMBODIMENTS

Synthesis of the new amorphous solid refractory composition of the present invention is carried out in a suitable reactor vessel by (1) preparing a first and second solution separately, the first solution comprising a source of aluminum (+3 valence), a source of rare earth metal (+3 valence) and phosphoric acid, and the second solution comprising a basic solution; (2) mixing the first and second solutions together with agitation, e.g. stirring, while maintaining the mixture pH at from about 8 to about 12, preferably from about 8.5 to about 9.5; and (3) recovering the amorphous solid precipitate formed during step (2).

The first solution will comprise one or more sources of aluminum ($Al^{+3}$). Such sources include as suitable examples aluminum nitrate and aluminum sulfate. The first solution will also comprise one or more sources of rare earth metal ($RE^{+3}$), including as suitable examples, lanthanum nitrate, lanthanum chloride and mixed rare earths such as rare earth chlorides. Commercial sources of rare earths often comprise mixtures of such metals, e.g. the chlorides. These aluminum and rare earth metal sources are dissolved in a suitable polar solvent medium, such as water. The first solution will also comprise phosphoric acid ($H_3PO_4$), e.g. in solution with water. The composition of this first solution will be comprised as follows:

| COMPONENT | WT % OF SOLUTION |
|---|---|
| Aluminum | 0.1 to 10 |
| Rare Earth metal | 0.1 to 10 |
| Phosphorus | 0.2 to 5 |

The second solution will comprise a basic solution (pH of from about 10 to about 14). Suitable components of this second solution include inorganic and/or organic bases such as, for example, ammonium hydroxide, ammonia, tetraalkylammonium hydroxide and alkylamine, alkyl being methyl-, ethyl-, propyl-, butyl- or a mixture thereof, e.g. tetramethylammonium and n-propylamine.

It is believed that the exact composition of the second solution, i.e. the type and concentration of organic or inorganic base, affects the pore size distribution in the final synthesis product. For instance, the use of tetramethylammonium hydroxide in the second solution, as exemplified hereinafter, results in an increased percentage of pores in the 100-200 Angstrom diameter range when compared to use of a basic second solution having no tetramethylammonium.

In general, the calcined amorphous refractory composition hereof will have a surface area of from about 50 m²/g to bout 500 m²/g, preferably from about 100 m²/g to about 250 m²/g; and a pore volume of from about 0.3 cc/g to about 1.5 cc/g, preferably from about 0.5 cc/g to about 1 cc/g.

The pore size distribution of the present material following calcination will include about 5 vol.% to about 20 vol.% within the pore size diameter range of 50 to 100 Angstroms, about 10 vol.% to about 35 vol.% within the pore size diameter range of 100 to 150 Angstroms, about 15 vol.% to about 50 vol.% within the pore size diameter range of 150 to 200 Angstroms and about 10 vol.% to about 50 vol.% within the pore size dimeter range of 200 to 400 Angstroms.

A further distinguishing feature of the present refractory composition is its ability to sorb vapor molecules of water, cyclohexane and n-hexane in an Equilibrium Sorption Test, hereinafter detailed, following calcination at 538° C. for 6 hours, of greater than about 10 wt.% water, greater than about 6 wt.% cyclohexane and greater than about 5 wt.% n-hexane.

The relative proportions of components of the present amorphous refractory composition in terms of rare earth oxide:aluminum oxide:aluminum phosphate (weight relationships) will be from about 10:20:70 to about 90:5:5, especially from about 25:20:55 to about 30:25:45.

The new amorphous, solid, combination refractory composition of the present invention may be used as a catalyst substrate or support for improved processes of upgrading tar sands bitumen, coal liquids, shale oil and petroleum residua. For instance, cobalt-molybdenum metals supported on the present combination refractory oxide material outperform conventional cobalt-molybdenum or alumina for upgrading atmospheric or vacuum resids by hydrotreatment. Use of the present refractory composition as support or matrix for fluid catalytic cracking catalyst is also contemplated.

Catalysts comprising the amorphous, solid, combination refractory composition of this invention include various catalytic metals, such as, for example, copper, zinc or a metal of groups IIIB (e.g. Sc, Y and La), IVB (e.g. Ti and Zr), VB (e.g. V), VIB (e.g. Cr, Mo and W), VIIB (e.g. Mn) or VIII (e.g. Fe, Co, Ni, Ru, Rh, Pd, Ir and Pt) of the Periodic Table of Elements. Preferred metals include cobalt, molybdenum, nickel and tungsten, alone or in combination with each other or another metal of the above-listed Periodic Table groups. The catalyst will comprise from about 0.1 wt.% to about 25 wt.%, preferably from about 2 wt.% to about 15 wt.%, incorporated catalytic metal.

The above metal component can be impregnated into the amorphous solid combination refractory composition of this invention or intimately physically admixed therewith. Such component can be impregnated in or on it such as, for example, by, in the case of platinum, treating the amorphous refractory composition with a solution containing a platinum metal-containing ion. Thus, suitable platinum compounds include chloroplatinic acid, platinous chloride and various compounds containing the platinum amine complex.

The amorphous refractory composition of this invention may be, either before or after incorporation of a catalytic metal component, dehydrated, at least partially. This can be done by heating to a temperature in the range of 200° C. to 595° C. in an inert atmosphere, such as air, nitrogen, etc., and at atmospheric, subatmospheric or superatmospheric pressures for between 15 minutes and 48 hours. Dehydration can also be performed at room temperature merely by placing the material in a vacuum, but a longer time is required to obtain a sufficient amount of dehydration.

The refractory composition, before or after metal incorporation, may be beneficially thermally treated prior to use in a chemical conversion process by heating at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C.

The amorphous, solid, combination refractory composition of this invention can be, before or after catalytic metal incorporation, shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the material is molded, such as by extrusion, it can be extruded before drying or partially dried and then extruded.

Although lanthana, alumina and aluminum phosphates are known individually, their combination composition in accordance herewith and its synthesis in accordance herewith are newly found. The utility of the present invention for improved catalysts for certain processes is newly found.

A catalyst made up of the present refractory composition and one or a combination of catalytic metals is useful for a variety of organic, e.g. hydrocarbon, compound conversion processes. Such conversion processes include, as non-limiting examples, demetalation of feedstock comprising resids with reaction conditions including a temperature of from about 300° C. to about 500° C., a pressure of from about 50 atmospheres (bar) to about 200 atmospheres and a weight hourly space velocity of from about 0.1 $hr^{-1}$ to about 10 $hr^{-1}$; methanol synthesis from synthesis gas with reaction conditions including a temperature of from about 250° C. to about 400° C., a pressure of from about 10 atmospheres to about 400 atmospheres and a gas hourly space velocity of from about 0.1 $hr^{-1}$ to about 10 $hr^{-1}$; and hydrotreating feedstock comprising resids with reaction conditions including a temperature of from about 200° C. to about 600° C., a pressure of from about 1 atmosphere to about 500 atmospheres, a weight hourly space velocity of from about 0.1 $hr^{-1}$ to about 10 $hr^{-1}$ and a hydrogen/hydrocarbon mole ratio of from about 1 to about 100.

The present refractory composition can be used as matrix for cracking catalyst, e.g. a zeolite having cracking activity, with beneficial results when compared to standard matrix materials for such use in cracking, e.g. fluidized catalytic cracking. In such a process, feedstock would comprise, for example, gas oils, and process conditions would include a temperature of from about 300° C. to about 600° C., a pressure of from about 1 atmosphere to about 10 atmospheres, a weight hourly space velocity of from about 0.1 $hr^{-1}$ to about 10 $hr^{-1}$, and a hydrogen/hydrocarbon mole ratio of from 0 (no added hydrogen) to about 10.

Natural zeolites which can be composed with the present refractory composition as matrix include gmelinite, chabazite, dachiardite, clinoptilolite, faujasite, heulandite, analcite, levynite, erionite, sodalite, cancrinite, napheline, lazurite, scolecite, natrolite, offretite, mesolite, mordenite, brewsterite, ferrierite and the like. The faujasites are preferred. Suitable synthetic zeolites for this purpose include zeolites X, Y, USY, A, L, ZK-4, B, E, F, HJ, M, Q, T, W, Z, alpha, beta, ZSM-5, ZSM-11, ZSM-5/ZSM-11 intermediate, ZSM-12, ZSM-22, ZSM-23, ZSM-35, ZSM-38, ZSM-48, ZSM-50, ZSM-57 and ZSM-58.

The zeolite is composited with the present matrix at from about 5 to about 50 wt.%, preferably from about 5 to about 35 wt.%, based on the weight of said matrix. The method for forming the final composited catalyst does not form a part of this invention, and any method well known to those skilled in the art is acceptable. For example, finely-divided zeolite can be admixed with finely-divided refractory composition and the mixture spray dried using conventional methods to form the final catalyst.

In order to more fully illustrate the nature of the invention and the manner of practicing same, the following examples, with all "parts" by weight, are presented. In the examples, whenever adsorption data are set forth for comparison of sorptive capacities for water, cyclohexane and/or n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (without about ±0.5 mm) by addition of adsorbate vapor controlled by a monostat during the adsorption period, which did not exceed about 8 hours. As adsorbate was adsorbed by the adsorbant, the decrease in pressure caused the manostat to open a valve which admitted more adsorbate vapor to the chamber to restore the above control pressures. Sorption was complete when the pressure change was not sufficient to activate the manostat. The increase in weight as calculated as the adsorption capacity of the sample in g/100 g of calcined adsorbant.

EXAMPLE 1

A first solution of aluminum (3+) and the rare earth lanthanum (3+) in phosphoric acid was prepared as follows. A 26 part quantity of Al(NO₃)₃.9H₂O was dissolved in 68 parts of distilled water. A 6 part quantity of La(NO₃)₃.6H₂O was dissolved in 68 parts of distilled water. The two solutions were thoroughly mixed together. Finally, a solution of 4 parts of 85 wt.% H₃PO₄ was added to the La—Al solution. This solution was thoroughly mixed and no solids were formed at this stage.

A second solution was prepared in a separate vessel of 27 parts of 29.9% NH₃ solution dissolved in about 27 parts of distilled water.

The precipitation procedure was carried out with the first and second solutions being slowly added simultaneously to a medium of 68 parts of distilled water with rapid mechanical stirring. The pH was maintained as close to 9.0 as possible at all times. The entire procedure was carried out at room temperature. After the precipitation was complete, the white slurry was stirred an additional 5 minutes, filtered rapidly, washed with distilled water and dried at 250° F. overnight. The recovered dry cake was calcined for 3 hours in flowing nitrogen at 1000° F. and in air for an additional 3 hours.

Stoichiometries used in the synthesis of this example are presented in Table 1, hereinafter.

EXAMPLE 2

The same lanthanum-aluminum-phosphoric acid first solution as in Example 1 was prepared. The second solution used was commercial (Southwestern Analytical Chemicals) tetramethylammonium hydroxide, 25 wt.%. The same precipitation procedure as in Example 1 was followed. The recovered dry cake was calcined as in Example 1.

Stoichiometries used in the synthesis of this example are presented hereinafter in Table 1.

EXAMPLE 3

The same lanthanum-aluminum-phosphoric acid first solution as in Example 1 was prepared. The second solution used was prepared by dissolving 51 parts of 29% $NH_3$ in 68 parts of distilled water and adding 20 parts of n-propylamine. The precipitation procedure followed was the same as in Example 1 with 13 parts of the base solution left unused. The product recovered after drying at 250° F. was calcined as in Example 1.

Stoichiometries used in the synthesis of this example are presented in Table 1 hereinafter.

EXAMPLE 4

Samples of the calcined products from Examples 1, 2 and 3 were submitted for elemental and physical property analyses. Results of these analyses are presented below in Table 2.

TABLE 1

| Example | Mole Percent | | | | | | pH |
|---|---|---|---|---|---|---|---|
| | La | Al | P | $NH_4OH$ | TMAOH | NPA | |
| 1 | 1.9 | 9.5 | 4.9 | 83.7 | — | — | 9 |
| 2 | 3.8 | 18.8 | 9.8 | — | 67.6 | — | 9 |
| 3 | 2.5 | 12.4 | 6.5 | 57.2 | — | 21.4 | 9 |

TABLE 2

| Chemical and Physical Properties | | | |
|---|---|---|---|
| Example | 1 | 2 | 3 |
| Analysis, wt. % | | | |
| $La_2O_3$ | 27.8 | 28.0 | 29.2 |
| $Al_2O_3$ | 41.7 | 41.9 | 41.1 |
| $P_2O_5$ | 28.26 | 28.81 | 26.79 |
| Ash | 99.30 | 98.07 | 98.77 |
| BET Surface Area, $m^2/g$ | 192 | 184 | 158 |
| Pore Vol, cc/g | | | |
| $N_2$ | 0.93 | 0.79 | 0.99 |
| Hg | 1.01 | 0.74 | — |
| Pore Size Distribution, | | | |
| % Pore Volume in Pores of | | | |
| 0-30 Angstroms Diameter | 0.3 | 0.0 | 0.0 |
| 30-50 | 2.0 | 1.2 | 0.7 |
| 50-100 | 10.9 | 11.4 | 9.8 |
| 100-150 | 20.5 | 31.8 | 23.6 |
| 150-200 | 21.7 | 44.1 | 23.4 |
| 200-400 | 36.6 | 11.3 | 35.7 |
| 400-600 | 8.0 | 0.2 | 6.9 |
| Sorptions, wt. % | | | |
| $H_2O$ | 11.7 | 11.5 | 10.4 |
| $C_7$-$C_6$ | 9.3 | 8.1 | 7.4 |
| n-$C_6$ | 6.3 | 5.7 | 6.3 |

EXAMPLE 5

To demonstrate utility of the present amorphous, solid, combination refractory composition as a catalyst support, samples of the Example 1 and 2 products were impregnated with 10 wt.% $MoO_3$ and 3.5 wt.% CoO. The impregnated catalysts were, subsequently, sulfided and evaluated for metals, sulfur, CCR and asphaltene removal in shaker bomb experiments with Arab Light vacuum resid with the following properties:

| Elemental Analysis (wt. %) | |
|---|---|
| Hydrogen | 10.68 |
| Sulfur | 3.93 |
| Nitrogen | 0.31 |
| CCR | 16.96 |
| Asphaltenes | 10.93 |
| Metal Analysis (ppm) | |
| Nickel | 16 |
| Vanadium | 65 |
| Iron | 12 |
| Sodium | 6 |
| Kinematic Viscosity (cs) | |
| 212° F. | 496.2 |
| 300° F. | 24.6 |

The shaker bomb experiments were conducted at an oil/catalyst weight ratio of 20/1, a temperature of 750° F., and a hydrogen pressure of 2000 psig, with reaction time controlled to be 80 minutes.

At the conclusion of each run, the catalyst and oil were separated and the oil was submitted for analysis. The effectiveness of each catalyst for resid upgrading was determined by comparing the degree of demetalation, desulfurization, CCR removal, etc., to that observed in an identical run in which a conventional $CoMo/Al_2O_3$ catalyst was used. Properties of the $CoMo/Al_2O_3$ catalyst are given in Table 3. Thermal contributions were determined from a blank run at identical conditions but with no catalyst present.

In Table 4 the results of the catalyst activity study are listed. At equivalent mesh sizes, the CoMo-impregnated catalysts of this invention have greater demetallation activity than the conventional $CoMo/Al_2O_3$ catalyst (62% and 57% vs 49%). In addition, sulfur removal activities of the present catalyst are better (43% and 41% vs 36%). Nickel levels in the treated products actually increase due to contamination that can be traced back to the stainless steel walls of the shaker bombs.

The simultaneous increase in demetalation and sulfur removal activities was unexpected. Often, with other catalysts, an increase in the demetalation activity occurs at the apparent expense of the sulfur removal activity.

TABLE 3

| $CoMo/Al_2O_3$ Resid Demetalation Catalyst Properties | |
|---|---|
| Metal Loading, wt. % | |
| MoO | 12.5 |
| $CoO^3$ | 3.5 |
| Physical Properties | |
| Surface Area, $m^2/g$ | 109 |
| Real Density, g/cc | 3.629 |
| Particle Density, g/cc | 1.221 |
| Pore Volume, cc/g | 0.543 |
| Avg. Pore Dia., Angstroms | 199 |
| Pore Size Distribution, | |
| % Pore Volume in Pores of | |
| 0-30 Angstrom Diameter | 14 |
| 30-50 | 1 |
| 50-80 | 1 |
| 80-100 | 2 |
| 100-150 | 23 |
| 150-200 | 37 |
| 200-300 | 13 |
| 300+ | 9 |

| Comparison of Resid Upgrading CoMo-Impregnated Catalyst Performance | | | | | |
|---|---|---|---|---|---|
| Catalyst Support | None (Thermal) | Al$_2$O$_3$ | Al$_2$O$_3$ | Example 1 | Example 2 |
| Mesh Size | — | 1/32" | 14–30 | 14–30 | 14–30 |
| Conditions | | | | | |
| Temp., °F. | 750 | 750 | 750 | 750 | 750 |
| Pressure, psig | 2000 | 2000 | 2000 | 2000 | 2000 |
| Oil/Cat | — | 20 | 20 | 20 | 20 |
| Time, min. | 80 | 80 | 80 | 80 | 80 |
| Liquid Product Analysis | | | | | |
| Hydrogen, wt. % | 10.58 | 10.69 | 10.88 | 12.03 | 11.09 |
| Sulfur, wt. % | 3.47 | 2.52 | 2.52 | 2.25 | 2.31 |
| Nitrogen, wt. % | 0.32 | 0.26 | 0.26 | 0.27 | 0.24 |
| Vanadium, ppm | 70 | 40 | 33 | 25 | 28 |
| Nickel, ppm | 16 | 31 | 10 | 19 | 15 |
| CCR, wt. % | 16.00 | 13.55 | 14.44 | 16.61 | 14.22 |
| Asphaltenes, wt. % | 8.52 | 5.40 | — | 4.73 | 5.84 |
| Vanadium Removal, % | 0 | 38 | 49 | 62 | 57 |
| Asphaltene Removal, % | 22 | 51 | — | 57 | 47 |
| Sulfur Removal, % | 12 | 36 | 36 | 43 | 41 |
| CCR Removal, % | 6 | 20 | 15 | 2 | 16 |

The improvement provided by the present invention is clear from the above resid hydrotreating experiments.

Because of the high pressures required for resid hydroprocessing, it is desirable from an economic standpoint to minimize reactor volume. Use of metal-containing supports of the present invention will allow a refiner to attain the required degree of metals removal with less catalyst and, consequently, in a smaller reactor. Alternatively, using catalysts comprising the present support composition in existing reactors will allow a refiner to run at lower reaction severities or to attain processed resids with improved quality.

What is claimed is:

1. A refractory composition comprising an amorphous, solid, combination of rare earth oxide, aluminum oxide and aluminum phosphate characterized after calcination by a surface area of from about 50 m$^2$/g to about 500 m$^2$/g, a pore volume of from about 0.3 cc/g to about 1.5 cc/g, and Equilibrium Sorption capacities of greater than about 10 wt.% for the water vapor, greater than about 6 wt.% for cyclohexane vapor and greater than about 5 wt.% for n-hexane vapor, said rare earth oxide, aluminum oxide and aluminum phosphate being present in the combination refractory composition, by weight, at from about 10:20:70 to about 90:5:5.

2. The composition of claim 1 wherein said rare earth is La, Ce, Pr, Nd, Sm, Eu, Gd, Tb, Dy, Ho, Er, Tm, Yb, Lu or a mixture thereof.

3. The composition of claim 1 wherein said rare earth comprises lanthanum.

4. The composition of claim 1 wherein said rare earth is a mixture comprising lanthanum and cerium.

5. The composition of claim 1 wherein said surface area is from about 100 m$^2$/g to about 250 m$^2$/g, and said pore volume is from about 0.5 cc/g to about 1 cc/g.

6. The composition of claim 1 wherein said rare earth oxide, aluminum oxide and aluminum phosphate are present, by weight, at from about 25:20:55 to about 30:25:45.

7. The composition of claim 1 having a pore size distribution following calcination of from about 5 vol.% to about 20 vol.% within the pore size diameter range of 50 to 100 Angstroms, from about 10 vol.% to about 35 vol.% within the pore size diameter range of 100 to 150 Angstroms, from about 15 vol.% to about 50 vol.% within the pore size diameter range of 150 to 200 Angstroms and from about 10 vol.% to about 50 vol.% within the pore size diameter range of 200 to 400 Angstroms.

8. A method for synthesizing a refractory composition comprising an amorphous, solid, combination of rare earth oxide, aluminum oxide and aluminum phosphate characterized after calcination by a surface area of from about 50 m$^2$/g to about 500 m$^2$/g, a pore volume of from about 0.3 cc/g to about 1.5 cc/g, and Equilibrium Sorption capacities of greater than about 10 wt.% for the water vapor, greater than about 6 wt.% for cyclohexane vapor and greater than about 5wt.% for n-hexane vapor, said rare earth oxide, aluminum oxide and aluminum phosphate being present in the combination refractory composition, by weight, at from about 10:20:70 to about 90:5:5, which comprises (i) preparing a first solution comprising a source of aluminum, a source of rare earth metal and phosphoric acid, said sources of aluminum and rare earth metal dissolved in suitable polar solvent medium, said phosphoric acid in solution with water, the composition of said first solution being from about 0.1 to about 10 wt.% aluminum, from about 0.1 to about 10 wt. % rare earth metal and from about 0.2 to about 5 wt.% phosphorus, (ii) preparing a second solution comprising a basic solution of pH from about 10 to about 14, (iii) mixing said first and second solutions together with agitation while maintaining the pH at from about 8 to about 12, and (iv) recovering the precipitate formed during said mixing step.

9. The catalyst composition comprising the refractory composition of claim 1 and from about 0.1 wt.% to about 25 wt.% of a catalytic metal selected from the group consisting of metals of groups IIIB, IVB, VB, VIB, VIIB and VIII of the Periodic Table of Elements, copper, zinc and combinations thereof.

10. The catalyst composition of claim 9 comprising from about 2 wt.% to about 15 wt.% of a catalytic metal selected from the group consisting of metals of groups IIIB, IVB, VB, VIB, VIIB and VIII of the Periodic Table of Elements, copper, zinc and combinations thereof.

11. The catalyst composition of claim 9 wherein said catalytic metal is selected from the group consisting of cobalt, molybdenum, nickel, tungsten, combinations thereof and combinations thereof with a different metal of groups IIIB, IVB, VB, VIB, VIIB and VIII of the Periodic Table of Elements copper and zinc.

12. The catalyst composition of claim 10 wherein said catalytic metal is selected from the group consisting of cobalt, molybdenum, nickel, tungsten, combinations thereof and combinations thereof with a different metal of groups IIIB, IVB, VB, VIB, VIIB and VIII of the Periodic Tble of Elements, copper and zinc.

13. The catalyst composition of claim 9 wherein said catalytic metal is selected from the group consisting of cobalt and molybdenum.

14. The catalyst composition comprising the refractory composition of claim 2 and from about 0.1 wt.% to about 25 wt.% of a catalytic metal selected from the group consisting of metals of groups IIIB, IVB, VB, VIB, VIIB and VIII of the Periodic Table of Elements, copper, zinc and combinations thereof.

15. The catalyst composition comprising the refractory composition of claim 3 and from about 0.1 wt.% to about 25 wt.% of a catalytic metal selected from the group consisting of metals of groups IIIB, IVB, VB, VIB, VIIB and VIII of the Periodic Table of Elements, copper, zinc and combinations thereof.

16. The catalyst composition comprising the refractory composition of claim 4 and from about 0.1 wt.% to about 25 wt.% of a catalytic metal selected from the group consisting of metals of groups IIIB, IVB, VB, VIB, VIIB and VIII of the Periodic Table of Elements, copper, zinc and combinations thereof.

17. The catalyst composition of claim 15 wherein said catalytic metal is selected from the group consisting of cobalt, molybdenum, nickel, tungsten, combinations thereof and combinations thereof with a different metal of groups IIIB, IVB, VB, VIB, VIIB and VIII of the Periodic Table of Elements, copper and zinc.

18. The catalyst composition of claim 15 wherein said catalytic metal is selected from the group consisting of cobalt and molybdenum.

19. The catalyst composition comprising the refractory composition of claim 1 and from about 5 to about 50 wt.% of natural or synthetic zeolite.

20. The catalyst composition of claim 19 wherein said zeolite is a natural zeolite selected from the group consisting of gmelinite, chabazite, dachiardite, clinoptilolite, faujasite, heulandite, analcite, levynite, erionite, sodalite, cancrinite, napheline, lazurite, scolecite, natrolite, offretite, mesolite, mordenite, brewsterite and ferrierite.

21. The catalyst composition of claim 19 wherein said zeolite is a synthetic zeolite selected from the group consisting of X, Y, USY, A, L, ZK-4, B, E, F, HJ, M, Q, T, W, Z, alpha, beta, ZSM-5, ZSM-11, ZSM-5/ZSM-11 intermediate, ZSM-12, ZSM-22, ZSM-23, ZSM-35, ZSM-38, ZSM-48, ZSM-50, ZSM-57 and ZSM-58.

* * * * *